United States Patent
Mendes et al.

(10) Patent No.: US 9,680,540 B2
(45) Date of Patent: Jun. 13, 2017

(54) WALSH-HADAMARD TRANSFORMED GFDM RADIO TRANSMISSION

(71) Applicant: Vodafone GmbH, Dusseldorf (DE)

(72) Inventors: Luciano Mendes, Dresden (DE); Ivan Gaspar, Dresden (DE); Maximilian Matthe, Dresden (DE); Andreas Festag, Dresden (DE); Gerhard Fettweis, Dresden (DE)

(73) Assignee: Vodafone GmbH, Dusseldorf (DE)

( * ) Notice: Subject to any disclaimer, the term of this patent is extended or adjusted under 35 U.S.C. 154(b) by 0 days.

(21) Appl. No.: 14/640,331

(22) Filed: Mar. 6, 2015

(65) Prior Publication Data
US 2016/0373172 A1 Dec. 22, 2016

(30) Foreign Application Priority Data
Mar. 7, 2014 (EP) .................................. 14158393

(51) Int. Cl.
| | | |
|---|---|---|
| H04L 27/28 | (2006.01) | |
| H04B 7/0456 | (2017.01) | |
| H04L 1/00 | (2006.01) | |
| H04L 27/26 | (2006.01) | |
| H04J 13/00 | (2011.01) | |
| H04B 1/7093 | (2011.01) | |
| H04J 11/00 | (2006.01) | |
| H04W 72/04 | (2009.01) | |

(52) U.S. Cl.
CPC ........ *H04B 7/0456* (2013.01); *H04J 13/0059* (2013.01); *H04L 1/0057* (2013.01); *H04L 27/264* (2013.01); *H04B 2001/70935* (2013.01); *H04J 2011/0009* (2013.01); *H04W 72/0446* (2013.01); *H04W 72/0453* (2013.01)

(58) Field of Classification Search
CPC ............... H04L 27/2647; H04L 5/0007; H04L 27/2636; H04W 72/044
USPC ......... 375/260, 147, 295, 340; 370/208, 329
See application file for complete search history.

(56) References Cited

U.S. PATENT DOCUMENTS

| | | | |
|---|---|---|---|
| 2009/0092038 A1* | 4/2009 | Mujtaba .............. | H04L 27/2678 370/208 |
| 2009/0207926 A1* | 8/2009 | Huang ................ | H04L 27/2633 375/260 |
| 2013/0163542 A1* | 6/2013 | Fettweis ............. | H04W 72/044 370/329 |

(Continued)

FOREIGN PATENT DOCUMENTS

| | | |
|---|---|---|
| EP | 2 200 244 | 6/2010 |
| EP | 2 348 655 | 7/2011 |
| EP | 2 608 474 | 6/2013 |

OTHER PUBLICATIONS

European Search report for EP 14 15 8393 dated Sep. 10, 2014.
(Continued)

*Primary Examiner* — Khai Tran
(74) *Attorney, Agent, or Firm* — Workman Nydegger

(57) ABSTRACT

A radio transmission system based on a frequency divisional multiplexing method is described, wherein a transmit symbol comprises a plurality of data symbols assigned to at least two subcarriers. The information of symbols of one time slot is spread across the data symbols of subcarrier of the time slot to produce a transmit symbol being more robust to frequency selective channels.

13 Claims, 3 Drawing Sheets

(56) References Cited

U.S. PATENT DOCUMENTS

2015/0071242 A1* 3/2015 Vilaipornsawai ... H04L 25/0224
370/330

OTHER PUBLICATIONS

Brandes S et al: "Compensation of the Impact of Interference Mitigation by Pulse Blanking in OFDM Systems", Global Telecommunications Conference, 2009. GLOBECOM 2009. IEEE, IEEE, Piscataway, NJ, USA, Nov. 30, 2009 (Nov. 30, 2009), pp. 1-6, XP031646222, ISBN: 978-1-4244-4148-8 * Section III.

Bianchi T et al: "Analysis of the effects of carrier frequency offset on filterbank-based MC-CDMA", Global Telecommunications Conference, 2004. GLOBECOM '04. IEEE Dallas, TX, USA Nov. 29-Dec. 3, 2004, Piscataway, NJ, USA,IEEE, Piscataway, NJ, USA, vol. 4, Nov. 29, 2004 (Nov. 29, 2004), pp. 2520-2524, XP010757981, DOI: 10.1109/GL000M.2004.1378460 ISBN: 978-0-7803-8794-2 * Sections II, III.

Riera-Palou F et al: "On the design of uplink and downlink group-orthogonal multicarrier wireless systems", IEEE Transactions on Communications, IEEE Service Center, Piscataway, NJ. USA, vol. 56, No. 10, Oct. 10, 2008 (Oct. 10, 2008), pp. 1656-1665, XP011236197, ISSN: 0090-6778, DOI: 10.1109/TCOMM.2008.060497 * Sections II, III.

* cited by examiner

WALSH-HADAMARD TRANSFORMED GFDM RADIO TRANSMISSION

CROSS-REFERENCE TO RELATED APPLICATIONS

This application claims priority to European Patent Application Number 14158393.0, filed on Mar. 7, 2014, the entirety of which is incorporated herein by reference.

BACKGROUND OF THE INVENTION

1. The Field of the Invention

The invention relates to a radio transmission system using the generalized frequency divisional multiplexing (GFDM) method. In particular the invention relates to applying a Walsh-Hadamard transformation to a block of GFDM data symbols.

2. The Relevant Technology

Unless otherwise indicated herein, the materials described in this section are not prior art to the claims in this application and are not admitted to be prior art by inclusion in this section. The use of the term "background" is inclusive of the term "context." Thus, the following section provides both context for the disclosure and may also provide patentable support for the claims.

The so-called GFDM system is a recent physical layer (PHY) scheme proposed to address the challenges for $5^{th}$ generation cellular systems with opportunistic use of frequency spectrum and relaxed synchronization. The GFDM system provides a fast, flexible scalable and content aware physical layer scheme which at the same time is robust and reliable, while using vacant frequency bands, e.g. so-called TV white spaces. The basic GFDM system has been described in "GFDM—Generalized Frequency Division Multiplexing" by Fettweis et al., IEEE VTC spring 2009.

Though the GFDM system shares some properties with well-known OFDM systems, there are significant differences. While both systems may divide an available frequency band into at least two adjoining sub-bands, the GFDM system may deploy individual transmission parameters for each of the at least two sub-bands while in OFDM the transmission parameters deployed in the sub-bands are similar or identical, i.e. uniform.

In contrast thereto the Generalized Frequency Division Multiplexing, GFDM, is a multicarrier scheme that uses pulse-shaping per subcarrier to achieve low out-of-band emissions OOBE, i.e. low out-of-band interference. Typically a prototype filter is used to pulse-shape a number of K subcarriers, wherein the filter impulse response is circularly shifted by K samples to obtain the pulse-shape for each time slot. This technique is known as tail-biting and eliminates the filtering tails, thus allowing a block-based data structure, where a number of M·K data symbols are transmitted using a number of K subcarriers, each subcarrier carrying a number of M data symbols per block.

The GFDM can be properly parameterized to address scenarios currently foreseen for the fifth generation of mobile communications, i.e. 5G. Single shot transmissions as required for the so-called tactile internet and random channel access as well as machine-to-machine communications and other low latency applications are challenging scenarios. In particular low-latency requirements prevent the use of retransmission protocols. Instead the data shall be reliably transmitted from source to sink using a single transmission burst, i.e. no retransmission, which at the same time avoids the use of long channel codes or interleavers.

However, at least one drawback of using short single-shot transmission using GFDM occurs in frequency selective channels. Deep notches in the frequency response of a channel may lead to unrecoverable burst errors at the receiver side.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only illustrated embodiments of the invention and are therefore not to be considered limiting of its scope. The invention will be described and explained with additional specificity and detail through the use of the accompanying drawings in which.

DETAILED DESCRIPTION

Figure 1:
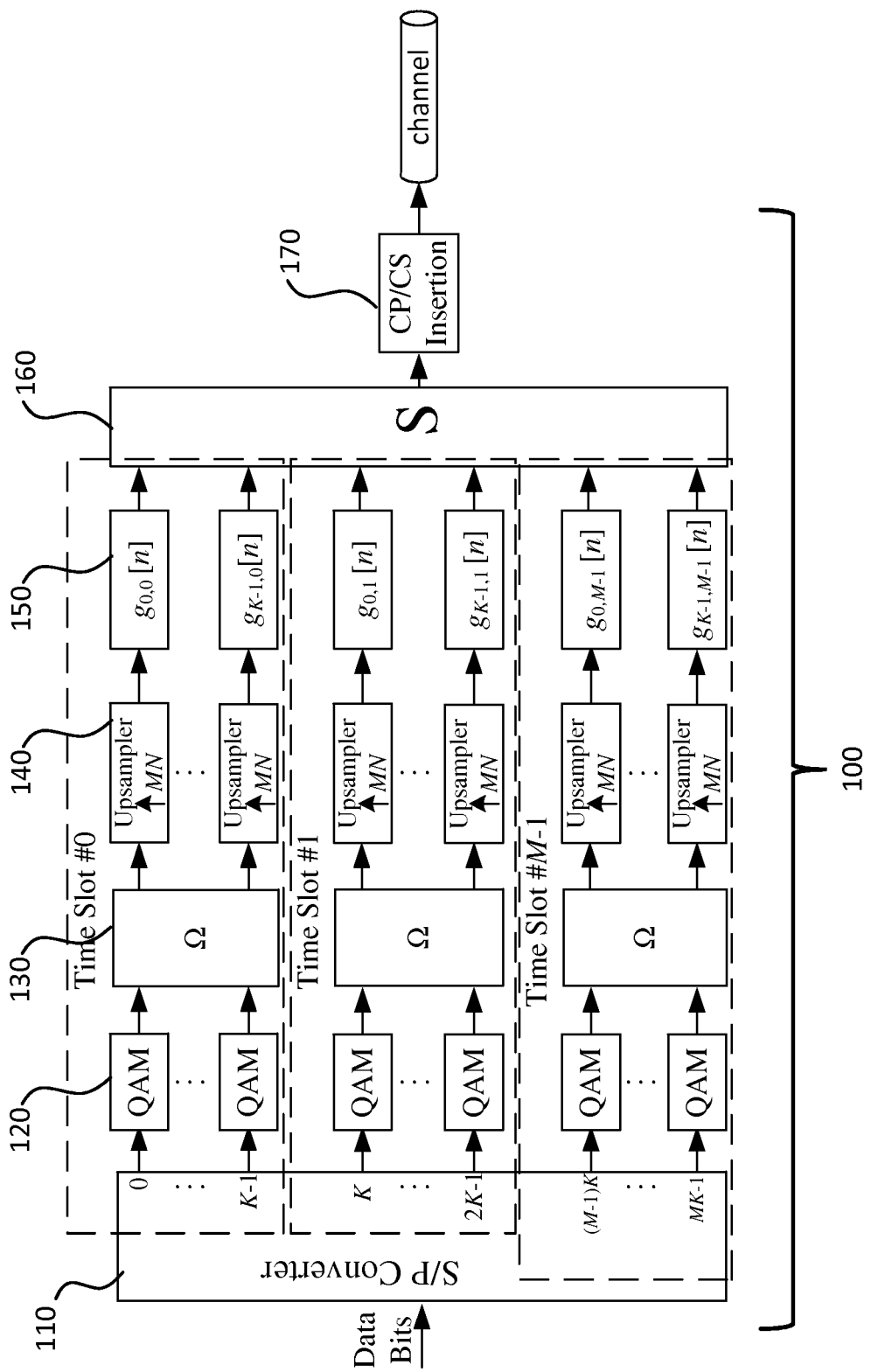
FIG. 1 illustrates a block diagram of a Walsh-Hadamard-GFDM transmitter.

The generalized frequency divisional multiplexing system defines a system architecture allowing opportunistically exploiting vacant frequency bands, for example TV white spaces, for wireless data communications. The system defines a concept for a physical layer and transmitters and receivers adapted and configured for using said physical layer concept as described below. Due to the opportunistic use of vacant frequency bands, i.e. bands that are not allocated for the GFDM system but currently are vacant, the signal generation in the GFDM system should ensure ultra-low out of band radiation to strictly avoid harmful interference to signals in adjoining frequency bands. Furthermore the receivers should exhibit high sensitivity in order to explore vacant frequency bands, i.e. to sense even very weak radio signals in the frequency bands that are candidates for use.

Vacant frequency bands for use may be detected by any arbitrary method or device. In one embodiment the transmitter and/or the receiver of the GFDM system may cooperatively detect vacant frequency ranges by scanning frequencies for radio signals. In that case the scanned frequency obviously is in use and consequently cannot be used by GFDM system. If at least one of the transmitter and the receiver detects a vacant frequency band, the detecting station may inform its communication partner via another established communication link about said detected vacant frequency band. The partner station may then sense that band in order to ensure that there is no signal detectable. If both communication partner stations consider the frequency band as vacant said band may be used subsequently by the communication partners. In this way transmitter and receiver may try to detect and agree on using vacant frequency bands in addition to the established communication link.

The described GFDM system may use a plurality of at least two frequency bands, wherein the carrier frequencies may have different bandwidths. In each of the two frequency bands a respective carrier frequency is individually modulated, i.e. the applied modulation scheme may vary from frequency band to frequency band, wherein some form of QAM modulation may be used.

Note that in one embodiment the frequency bands may be divided by a frequency band occupied by another transmission, i.e. at least two frequency bands used by the described system are not adjacent, but separated by a frequency band occupied by another transmission. So in contrast to OFDM the described GFDM system does not rely on adjacent subcarriers.

Each carrier is divided into time slots of equal duration, i.e. within each frequency band time slots of equal duration are defined. However, time slots of different frequency bands may differ in duration, i.e. symbol duration used for transmission in a first frequency band may differ from symbol duration used in a second frequency band. Consequently the number of time slots may vary between frequency bands. In frequency bands of larger bandwidth a higher number of time slots, i.e. shorter in duration, can be used within a transmit block than in frequency bands of smaller bandwidth.

As a consequence a higher number of time slots are possible and used in a frequency band of larger bandwidth while achieving the same block size when combining said frequency band with a band of smaller bandwidth. Note that below described application of a transformation matrix to data symbols requires a common number of time slots, i.e. a common number of symbols. Consequently, below described transformation may be applied to data symbols in subcarriers having a common number of data symbols, i.e. time slots. However, in one embodiment a transmit symbol may comprise two groups of subcarriers, wherein each group of subcarriers exhibits a common number of time slots/data symbols, but wherein the groups exhibit different numbers of subcarriers, and wherein the groups require individual transform and modulation matrices.

Figure 2:
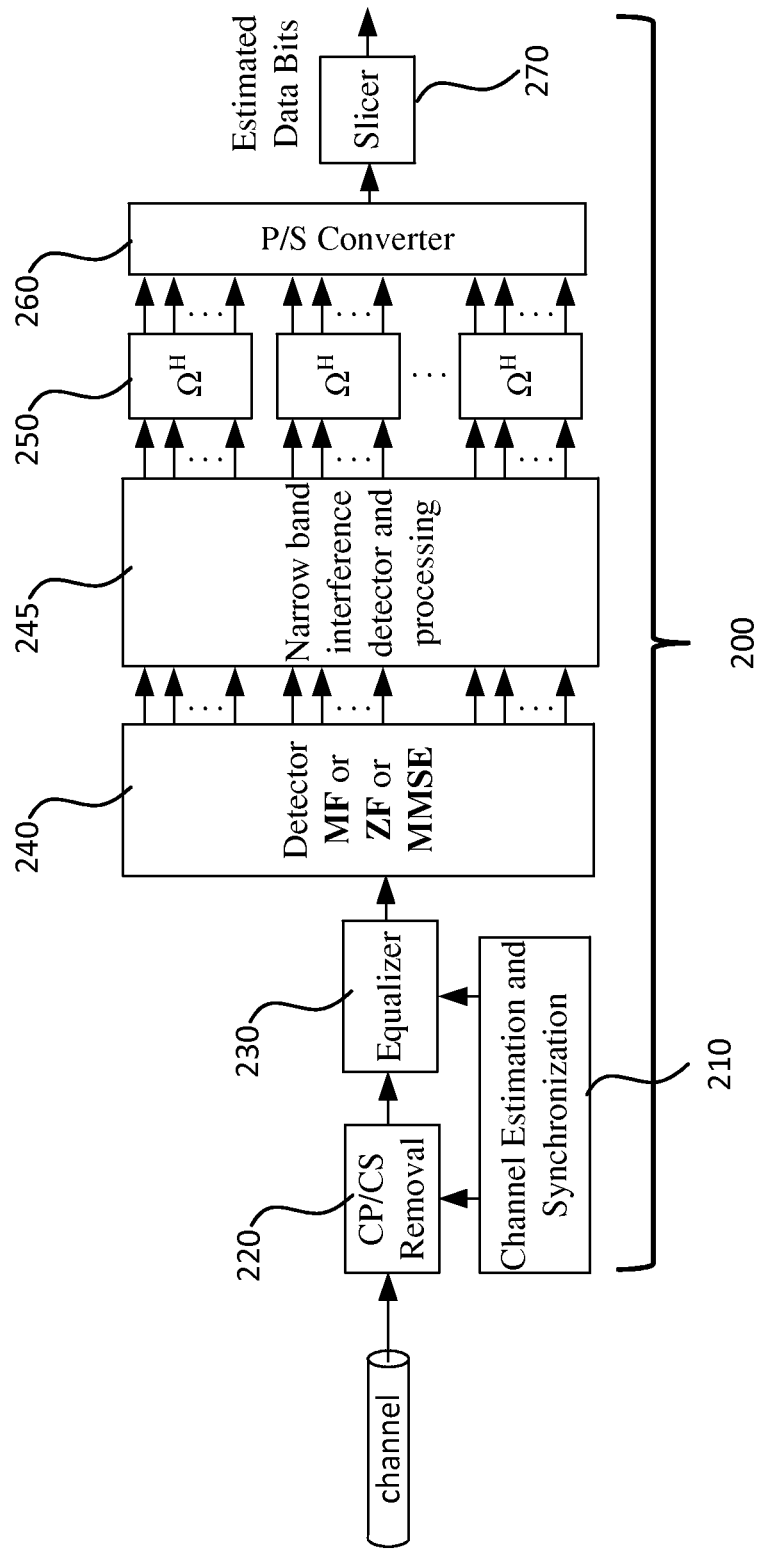
FIG. 2 illustrates a block diagram of a Walsh-Hadamard-GFDM receiver.

FIG. 1 depicts a block diagram of a GFDM transmitter 100 adapted for transmitting data bits through a channel according to the invention. A corresponding receiver 200 coupled to the transmission channel is depicted in FIG. 2. The system schematically depicts a GFDM transmission system adapted and configured for implementing the invention, wherein figures provide an overview of the processing.

The processing blocks of transmitter 100 may be all digital except for a digital-to-analog converter that converts the transmit signal from a digital representation to an analog signal prior to transmitting the signal by a transmit antenna and except for processing blocks arranged in the chain of processing blocks behind that converter. Similarly the receiver may comprise digital processing blocks only except for an analog-to-digital converter at the radio front end of the receiver and processing blocks arranged in the processing chain before said analog-to-digital converter such as a low-noise amplifier.

Note that in FIG. 1 the number of time slots per GFDM symbol is denoted by M, wherein an individual time slot is indexed by m with $0 \leq m \leq M-1$. Furthermore one GFDM symbol is transmitted using a number of K subcarriers, wherein an individual subcarrier is indexed by $0 \leq k \leq K-1$.

In one embodiment a data source may provide a stream of data bits. The data bits are multiplexed by a serial-to-parallel converter 110 to a plurality of parallel substreams. The data bits are organized in M·K sets, wherein each set is mapped by a mapper 120 to a complex data symbol $d_{k,m}$, wherein the mapping may be conventional. In one embodiment the mapping may be a conventional J-QAM mapping, wherein J is the order of the mapping. Thus data bits are mapped to a number of M·K data symbols $d_{k,m}$. Note that in the following a group of data symbols assigned to a number of K subcarriers in one time slot m may be termed a sub-symbol, thus there are K data symbols in the m-th sub-symbol Each sub-symbol consists of a number of $N \geq K$ samples, wherein a sample is a complex value. Consequently, the mapping of sets of data bits to data symbols leads to a block structure of M·N samples.

Then in block 130 a transformation is applied all K data symbols of a subsymbol, i.e. all data symbols of an m-th time slot, that spreads the information of a single data symbol to the data symbols of all subcarriers of said m-th time slot. In particular said transformation is applied to all sub-symbols of the transmit symbol. As a consequence the information of a single data symbol is spread to the data symbols of all subcarriers of the time slot corresponding to the one sub-symbol. Since the transformation is applied to all data symbols of a time slot, each subcarrier carries at least a portion of the information of each other data symbol in said time slot.

Said spreading of information can be effected by applying a matrix transformation using a spreading matrix $\square$ for which the condition $\square \times \square^H = I$ holds, wherein I is the identity matrix.

In one embodiment a Walsh-Hadamard matrix can be used as spreading matrix in block 130, wherein the Walsh-Hadamard transformation, WHT, requires K to be a power of two. As a consequence the Walsh-Hadamard transformation matrix is a square matrix with dimension K×K wherein K is a power of 2. In an alternative embodiment a Cazac matrix can be used as spreading matrix.

In the next processing step the transformed samples are up-sampled in block 140. The up-sampled samples, i.e. the block of samples, are pulse shaped by $g_{k,m}[n]$ by a pulse-shaping filter block 150. Note that in one embodiment for each subcarrier an individual pulse shaping filter may be provided, i.e. each of the K subcarriers may undergo an individual pulse shaping.

The pulse-shaped samples of all K subcarriers then are summed in block 160 to form a single WHT-GFDM symbol $x_Q[n]$, to which a cyclic prefix CP and/or a cyclic suffix CS can be added in block 170 in order to avoid inter-symbol interference, ISI.

Lastly the symbol including the optional cyclic prefix and cyclic suffix, i.e. the complex-valued samples reflecting the symbol are forwarded to a digital-to-analog converter and subsequent analog processing and amplifying stages, which are not shown in the figure, before it is transmitted, i.e. radiated, through a channel.

FIG. 2 depicts a receiver 200 adapted and configured for receiving and processing the signals transmitted by transmitter 100 as described above. Receiver 200 receives analog signals transmitted by transmitter 100, wherein the signals are attenuated and distorted by the channel. The received analog signals as received by an antenna may be amplified and processed before it is digitized, i.e. sampled and quantized thus producing complex-valued samples representing a received symbol. The samples of a received signal can be represented by a receive vector $y_e$.

Based on the receive vector the channel properties, i.e. the channel impulse response CIR, may be estimated and the vector may be synchronized in block 210, before samples of a cyclic prefix and cyclic suffix are removed in block 220 from the receive vector, wherein we assume that the cyclic prefix is larger than the channel length. Furthermore signal represented by the samples of the receive vector is equalized in block 230 before being passed to detector 240.

Basically detector 240 can be any conventional detector, e.g. implementing a minimum mean squared error algorithm, MMSE, or a matched filter algorithm, MF, or in a preferred embodiment a zero-forcing algorithm, ZF.

Detector 240 outputs a plurality of sub-symbols, wherein a sub-symbol comprises transformed data symbols. The transformed sub-symbols are forwarded to transformation block 250 where a transformation, i.e. an inverse of the transformation applied to the data symbols at the transmitter side, is applied to the symbols to reverse the transformation performed at the transmitter side. Note that an optional narrow band interference detector and processing block 245 can be arranged between detector 240 and transformation block 250 for identifying subcarriers exhibiting excess narrow band interference as described in more detail below.

The transformed data symbols then are then passed to a parallel-to-serial converter 260 that outputs a serial stream of symbols.

The serial stream of symbols is then passed to a slicer 270 that processes the serial stream soft symbols, each soft symbols comprised of a data symbol and interference and noised added by the channel, determines the most probable data symbol corresponding to the soft symbol. Slicer 270 furthermore de-maps the determined data symbol, i.e. converts the serial stream of determined data symbol into a stream of bits thus outputting a stream of estimated data bits.

A transmit symbol $x_\Omega[n]$ can be generated at the transmitter side by performing matrix operations. The sub-symbol $c_m$ transmitted in the m-th time slot, i.e. the m-th sub-symbol consisting of the data symbols assigned to all K subcarriers, can be calculated as $$c_m = \frac{1}{\sqrt{K}} \Omega_K d_m$$

wherein m is the index of a time slot, K is the number of subcarriers and wherein $\Omega_K$ is the transform matrix, i.e. the spreading matrix, wherein in this exemplifying calculation a Walsh-Hadamard transformation matrix is considered:

$$\Omega_K = \begin{bmatrix} \Omega_{K/2} & \Omega_{K/2} \\ \Omega_{K/2} & -\Omega_{K/2} \end{bmatrix}$$

wherein $\Omega_1=1$.

Transmission matrix A is defined by $$A = [g_{0,0}[n] \ldots g_{K-1,0}[n] g_{0,1}[n] \ldots g_{K-1,M-1}[n]]$$

where $$g_{k,m}[n] = g[(n - mN) \bmod MN] e^{-j2\pi \frac{k}{N} n}$$

with $g_{k,m}[n]$ being the impulse response, i.e. a filter for the k-th subcarrier of the m-th sub-symbol. Transmit matrix A thus translates all M circularly shifted impulse responses to all K subcarriers.

And with the concatenation of a number of M Walsh-Hadamard-transformed sample vectors $$c = [c_0^T c_1^T \ldots c_{M-1}^T]$$

the transmit vector can be written in matrix form as $$x_\Omega = Ac.$$

Thus the transmitted signal is $$x_\Omega = \frac{1}{\sqrt{K}} \sum_{m=0}^{M-1} \sum_{k=0}^{K-1} \sum_{j=0}^{K-1} a_{j,k} d_{j,m} g_m[n] e^{-j2\pi \frac{k}{N} n}$$

i.e. the transmitted signal is the sum of all symbols $d_{j,m}$ that have been Walsh-Hadamard-transformed by multiplication with $a_{j,k}$ and that have been filtered and up-converted to the respective k-th transmit frequency by multiplication with $$g_m[n] e^{-j2\pi \frac{k}{N} n},$$

wherein K is the number of subcarriers, M is the number of time-slots per GFDM transmit symbol, $d_{j,m}$ is the j-th data symbol of the m-th time-slot, $a_{j,k}$ is the coefficient of the j-th row and k-th column of the spreading matrix □, and $g_m[n]$ is the filter impulse response circularly shift of the mN samples and N is the number of samples per time-slot.

The processing at the receiver side also can be described in mathematical terms. After synchronization, equalization, and removal of a cyclic prefix CP and/or a cyclic suffix CS a received vector of samples y is $$y = x \circledast h + w$$

wherein h is the channel impulse response vector CIR, w is the additive white Gaussian AWGN vector with variance $\sigma^2 = N_0/2$, and ⊛ denotes the circular convolution.

Under the assumption that the channel impulse response is known at the receiver side and the cyclic prefix CP is larger than the channel length, frequency domain equalization can be applied, yielding $$y_e = F^{-1} \left[ X + \frac{W}{H} \right]$$

wherein F is the Fourier matrix, X is the transmitted vector and W is the noise vector in the frequency domain and H is the channel frequency response.

Decoder 240, which in one particular embodiment may be a ZFR, then may calculate the received transformed sample vector as $$\hat{c} = A^+ y_e = c + w_e$$

wherein $A^+$ is the inverse of A and the equivalent noise vector is $$w_e = A^+ F^{-1} \frac{W}{H}$$

The recovered data symbols for each time-slot thus are given by $$\hat{d}_m = \frac{1}{\sqrt{K}} \Omega_K \hat{c}_m = d_m + \frac{1}{\sqrt{K}} \Omega_K w_{em}$$

where $w_{em}$ is the equivalent noise vector containing the samples corresponding to the m-th subsymbol. Note that because the transformation combines the noise samples without changing the variance, each equivalent noise sample is a linear combination to the AWGN noise samples weighted by the channel frequency response and enhanced by the ZFR.

So by applying a transformation, e.g. in one embodiment by applying a Walsh-Hadamard matrix or a Cazac matrix or any other matrix where rows and columns are orthogonal, to the data symbols of all K subcarriers of one time slot m, the information of each data symbol is spread to all data symbols of said m-th timeslot. In other words the transformed data symbols of the m-th timeslot are a linear combination of K data symbols of the m-th time slot. As a consequence each data symbol in the m-th time slot contains at least some information of each other data symbol of the m-th time slot.

In case of a frequency selective channel, FSC, i.e. one subcarrier of the received plurality of subcarriers is found unusable, e.g. due to heavy interference by another signal or severely attenuated or erased, the information carried by the unusable subcarrier is lost. However, since the remaining subcarriers still carry a linear combination of all data symbols, the information of all data symbols can be reconstructed by applying an inverse Walsh-Hadamard transformation to the remaining encoded received symbols. Accordingly, if a subset of subcarriers is severely attenuated by the channel, the information provided by the remaining subcarriers allows reconstruction of the entire information. Though a subset of subcarriers may be attenuated, the burst transmission is successful.

In one embodiment the receiver may optionally comprise a narrow band interference detector and processing block 245 to clip subcarriers having an amplitude exceeding a predefined threshold value in order to prevent spreading of a heavily distorted subcarrier. Subcarriers showing an excess amplitude, i.e. an amplitude significantly higher than an average expected, most probably have been distorted by a narrow band interference, i.e. the payload signal of the subcarrier is overlaid by a strong interfering signal. If such a distorted subcarrier would be processed using the inverse transformation matrix, then the strong interfering signal would be spread across all healthy, i.e. non- or less-interfered subcarriers.

The method performed at the receiver accordingly may optionally comprise the step of identifying subcarriers having an excess amplitude, i.e. subcarriers having an amplitude exceeding the predefined threshold, before applying the inverse of the transformation matrix. In one embodiment that identification can be performed based on analyzing the noise distribution and noise variance of the subcarriers. In case a subcarrier of excess amplitude is identified, the receiver may ignore signals carried by that subcarrier frequency in order to prevent spreading the heavily distorted subcarrier signals across other, non-infected subcarriers. In this way the method may prevent distortion, i.e. deterioration, of subcarrier signals that do not exceed the predefined threshold amplitude value. As a consequence the described method can be used in channels that may exhibit notches, i.e. where subcarriers are heavily attenuated, but also where subcarriers may be deteriorated by a strong, narrowband and impulsive interferer. The receiver may adapted correspondingly, i.e. the receiver may comprise a corresponding narrow band interference detector and processing block 245 for identifying and—as the case may be—set a filter for ignoring signals of the identified subcarrier.

As a consequence the proposed application may enhance the reliability of data communication when using a frequency selective channel FSC, and particularly in single shot transmissions, when low out-of-band radiation is required and spectrum fragmentation is present.

Further note that a Walsh-Hadamard transformation at the transmitter side is applied to data symbols. The transformation does not add any redundancy, consequently it does not affect the amount of data to be transmitted, but only increases the processing load both on the transmitter and on the receiver side of the transmission system by applying the Walsh-Hadamard transformation.

The bit error rate, BER, performance of the afore-described transmission system over frequency selective channels, FSCs, can be estimated as an average of the performance of each subcarrier considering the corresponding channel frequency response. Therefore the bit error probability can be approximated by $$p_b \approx \frac{2(L-1)}{KL\log(J)} \sum_{k=0}^{K-1} \mathrm{erfc}\left(\sqrt{\frac{3}{2}\frac{|H[k]|^2}{(J-1)}\frac{\log_2(J)E_b}{\xi N_0}}\right)$$

where H[k] is the flat channel frequency-response per subcarrier, $E_b$ is the average energy per bit of the deployed J-QAM constellation, and $N_0$ is the noise spectral density.

Considering now that the equivalent channel after the inverse Walsh-Hadamard-Transformation has a flat frequency response $$H_e = \left(\frac{1}{K}\sum_{k=0}^{K-1}\frac{1}{|H[K]|^2}\right)^{-1/2}$$

above given bit error probability approximation can be used to estimate the bit error rate, BER, of the Walsh-Hadamard-Transformation GFDM over frequency selective channels, FSCs. Since the channel is flat, all subcarriers present the same performance, thus $$p_b \approx \frac{2(L-1)}{L\log_2(J)} \mathrm{erfc}\left(\sqrt{\frac{3}{2}\frac{|H_e|^2}{(J-1)}\frac{\log_2(J)E_b}{\xi N_0}}\right)$$

Based on this bit probability one can conclude that the performance gain of the Walsh-Hadamard-Transformation GFDM system depends on the channel frequency response. A slight or even no performance gain is expected for a flat channel, while a high performance gain is expected for FSCs with narrow notches, because in this case the data symbols can be successfully recovered even if a subset of subcarriers is severely attenuated by the channel.

Figure 3A:
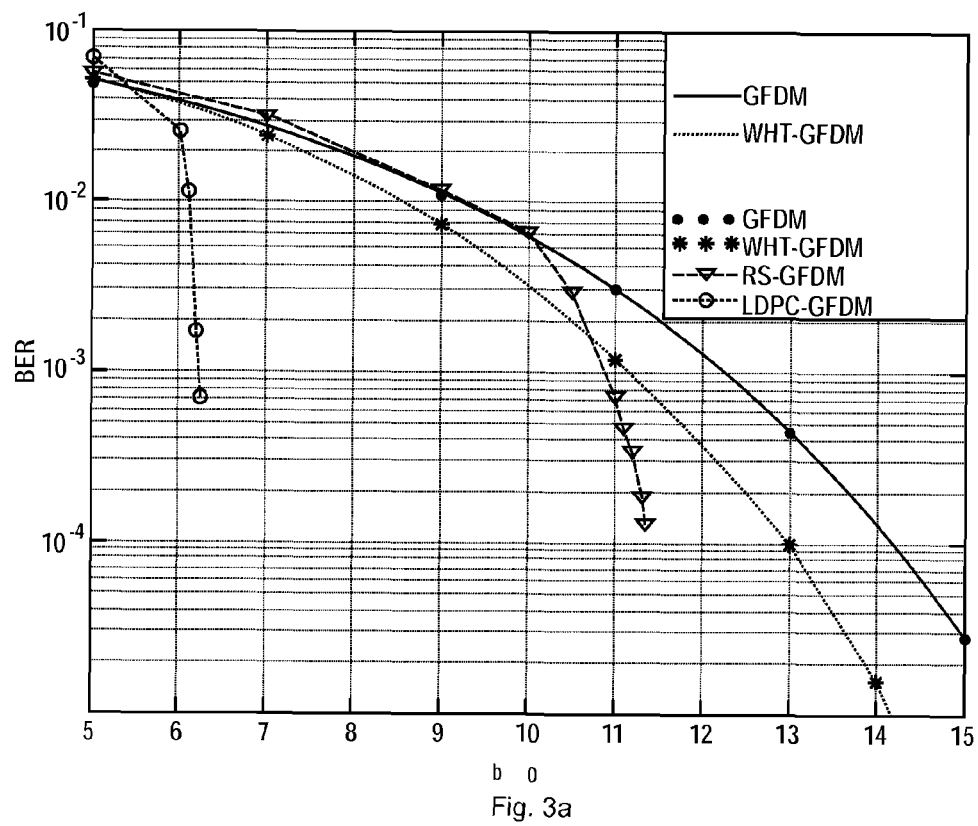
FIGS. 3a and 3b illustrate simulation curves of coded GFDM for comparison to other encoding schemes.
Figure 3B:
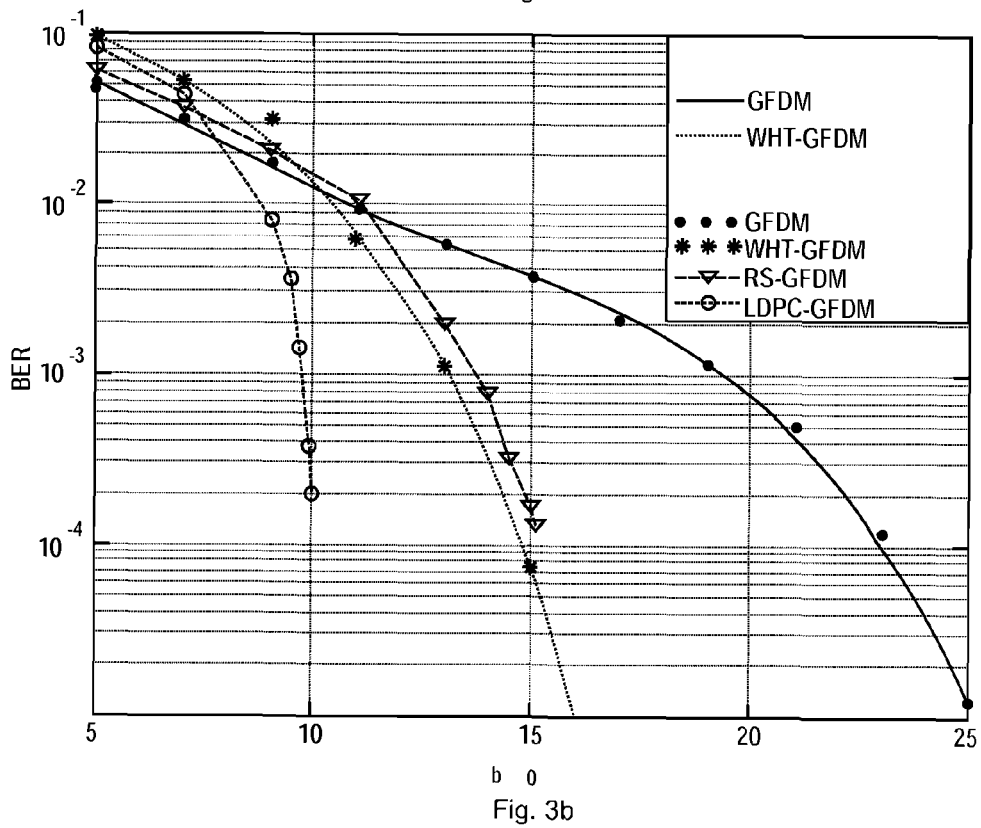

FIGS. 3a and 3b depict simulation curves of coded GFDM for comparison to other encoding schemes. Two codes are considered:
  i) a low-density parity-check, LDPC, code with a length of 64,800 bits and a code rate of ¾ and
  ii) a Reed-Solomon, RS, code (224, 204).

LDPC is a powerful code that achieves the best performance of the presented cases. However, LDPC uses a long code word, and the iterative decoding process requires knowledge of the signal-to-noise ratio to compute the log-likelihood ratio (LLR). This process increases both the latency and the complexity of the receiver and might be inappropriate for low-latency scenarios, power-limited devices and single burst transmissions. The Reed-Solomon code is an interesting solution for avoiding burst errors. The non-iterative decoding process introduces small latency and it does not require knowledge of the channel parameters. The code word can be shortened to match the GFDM frame size, which is appropriate for burst transmissions. However, energy limited low-cost devices might not be able to afford the complexity of the RS decode. Although RS-GFDM outperforms WHT-GFDM for channel A, both schemes have similar performance when the channel frequency response has deep notches, as shown in FIG. 3b.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for transmitting digital data in a transmit symbol using a generalized frequency divisional multiplexing (GFDM) system, the transmit symbol comprising a plurality of data symbols assigned to at least two subcarriers, the method comprising:
    mapping a plurality of data bits to data symbols and assigning data symbols to the at least two subcarriers;
    spreading the information of each data symbol of a time slot of the transmit symbol across the data symbols of each subcarrier of the time slot, wherein a transformation matrix to all data symbols of the time slot is applied, wherein the rows and columns of the transformation matrix are orthogonal;
    appending at least one of a cyclic prefix or a cyclic suffix to the transmit symbol; and
    transmitting the transmit symbol and the cyclic prefix and/or the cyclic suffix.

2. The method of claim 1, wherein the transformation matrix is a Walsh-Hadamard matrix or a Cazac matrix.

3. The method of claim 1, wherein the at least two subcarriers are separated by another frequency band occupied by another transmission.

4. The method of claim 1, wherein spreading the information of each data symbol of a time slot of the transmit symbol to the data symbols of each subcarrier of the time slot is performed for each time slot of the transmit symbol.

5. A method for receiving digital data using a generalized frequency divisional multiplexing (GFDM) system, the method comprising:
    receiving a frequency divisional multiplex signal representing a transmit symbol, the transmit symbol comprising a plurality of data symbols assigned to at least two subcarriers;
    removing at least one of a cyclic prefix or a cyclic suffix from the transmit symbol;
    de-spreading the information of each received data symbol of a time slot of the transmit symbol to the data symbols of each subcarrier of the time slot by applying an inverse of the transformation applied at the transmitter, wherein an inverse of a corresponding transformation matrix is applied, wherein rows and columns of the transformation matrix are orthogonal; and
    decoding the data symbols.

6. The method of claim 5, wherein the transformation matrix is an inverse of a Walsh-Hadamard transformation matrix or an inverse of a corresponding Cazac transformation matrix.

7. The method of claim 5, wherein the at least two subcarriers are separated by another frequency band occupied by another transmission.

8. The method of claim 5, further comprising identifying at least one subcarrier having an amplitude exceeding a predefined threshold value before performing de-spreading of the received data symbols and ignoring the identified subcarrier while de-spreading.

9. A transmitter adapted and configured for transmitting digital data using a generalized frequency divisional multiplexing method (GFDM), wherein a transmit symbol comprises a plurality of data symbols assigned to at least two subcarriers, said transmitter being adapted for:
    mapping a plurality of data bits to data symbols and assigning data symbols to the at least two subcarriers;
    spreading the information of each data symbol of a time slot of the transmit symbol to the data symbols of each subcarrier of the time slot, wherein a transformation matrix to all data symbols of said time slot is applied, wherein the rows and columns of the transformation matrix are orthogonal;
    appending at least one of a cyclic prefix or a cyclic suffix to the transmit symbol; and
    transmitting the transmit symbol and the cyclic prefix and/or the cyclic suffix.

10. The transmitter of claim 9, wherein the transformation matrix is a Walsh-Hadamard matrix or a Cazac matrix.

11. A receiver for receiving digital data using a generalized frequency divisional multiplexing (GFDM) method, wherein a received GFDM signal represents a transmit symbol, the transmit symbol comprising a plurality of data symbols assigned to at least two subcarriers, the receiver configured for:
    receiving a frequency divisional multiplex signal representing a transmit symbol, said transmit symbol comprising a plurality of data symbols assigned to at least two subcarriers;
    removing at least one of a cyclic prefix or a cyclic suffix from the transmit symbol;
    de-spreading the information of each received data symbol of a time slot of the transmit symbol to the data symbols of each subcarrier of said time slot by applying an inverse of the transformation applied at the transmitter, wherein an inverse of a corresponding transformation matrix is applied, wherein rows and columns of the transformation matrix are orthogonal; and
    decoding the data symbols.

12. The receiver of claim 11, wherein the transformation matrix is an inverse of a Walsh-Hadamard transformation matrix or an inverse of a corresponding Cazac transformation matrix.

13. The receiver of claim 11, further configured for performing identifying at least one subcarrier having an amplitude exceeding a predefined threshold value before performing de-spreading of the received data symbols and ignoring the identified subcarrier while de-spreading.

* * * * *